Dec. 1, 1931. S. G. WILSON 1,834,909
WHISK
Filed Aug. 3, 1929
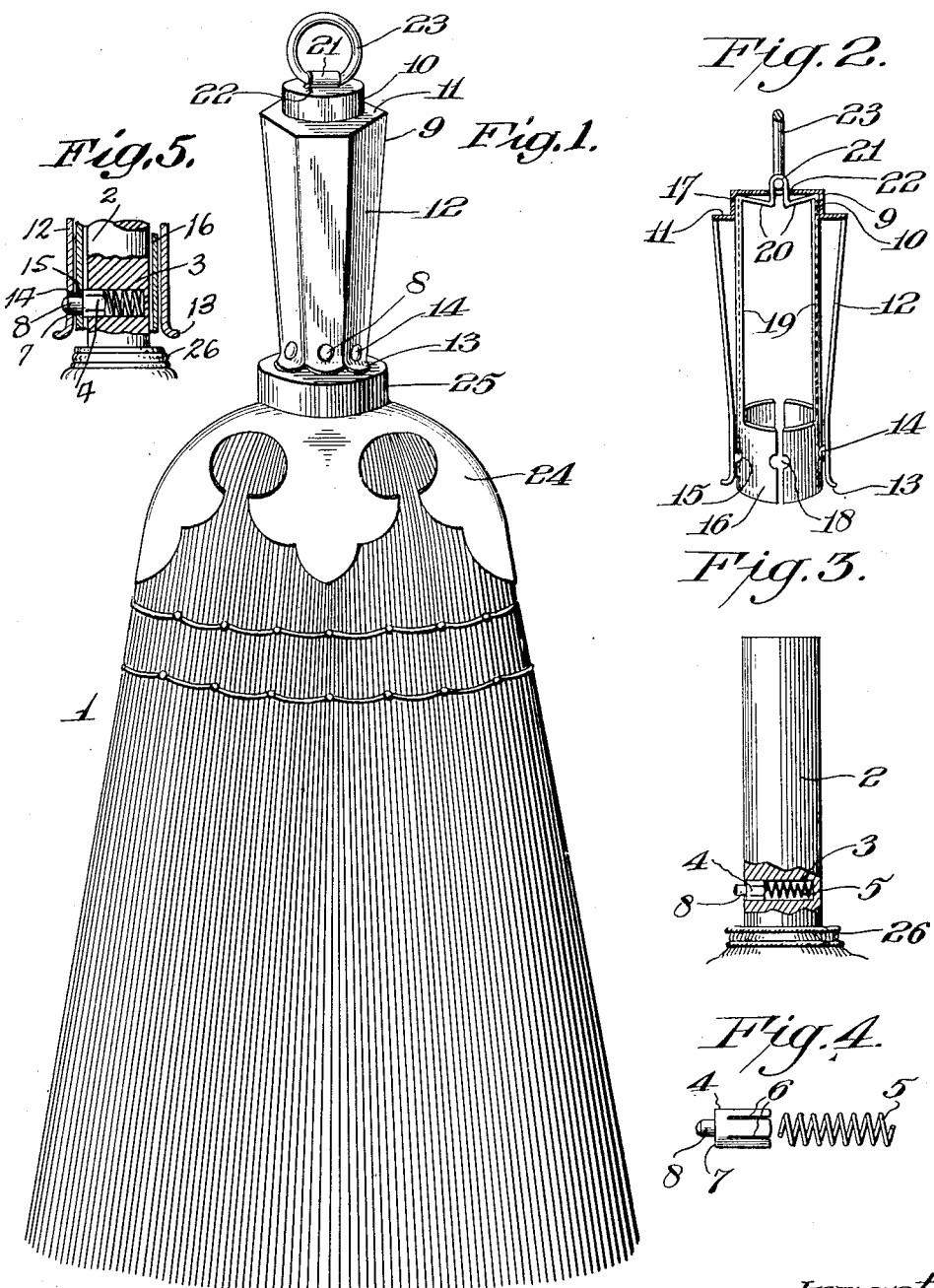
Inventor
Stephen G. Wilson,
By Herbert S. Fairbanks
Attorney Patented Dec. 1, 1931

1,834,909

UNITED STATES PATENT OFFICE

STEPHEN G. WILSON, OF PHILADELPHIA, PENNSYLVANIA, ASSIGNOR OF ONE-FOURTH TO JESSE L. MANNING, OF ARDMORE, PENNSYLVANIA, ONE-FOURTH TO HUGO W. ZINTNER, OF PHILADELPHIA, PENNSYLVANIA, AND ONE-FOURTH TO PAUL C. KLINGLER, OF RIVERSIDE, NEW JERSEY

WHISK

Application filed August 3, 1929. Serial No. 383,341.

The object of this invention is to devise a novel renewable whisk wherein when the brush portion is worn out it can be readily renewed.

In whisks as ordinarily manufactured the handle is fixedly connected with the dowel stick of the whisk to which the straws are fastened so that when the brush portion of the whisk is worn out the entire whisk must be thrown away, handle and all.

With the above and other objects in view, as will hereinafter more clearly appear, my invention comprehends a novel renewable whisk.

It further comprehends a novel renewable whisk wherein the handle is connected with the whisk by means of a manually actuated locking plunger or push button.

It further comprehends a novel whisk having a removable handle and a spring member within said handle adapted to be received by the dowel stick, the handle proper being provided with spring fingers, their ends brought together to encircle said spring member, and having means to interlock with the spring member and the spring member being adapted to extend through the upper end of the handle to receive and resiliently retain a ring, said ring holding said spring member in place.

It further comprehends a novel construction of a handle, a novel construction of a spring member, and novel means for interlocking the handle and spring member with the dowel stick.

Other novel features of construction and advantage will hereinafter clearly appear in the detailed description and the appended claims.

For the purpose of illustrating the invention, I have shown in the accompanying drawings a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a perspective view of a whisk embodying my invention.

Figure 2 is a sectional elevation of the handle.

Figure 3 is a side elevation of the handle partly in section to show the manually actuated spring pressed plunger.

Figure 4 is a plan view of the manually actuated plunger and its spring.

Figure 5 is a section showing the manner in which the plunger interlocks with the handle.

Similar numerals of reference indicate corresponding parts.

Referring to the drawings:—

1 designates a whisk embodying my invention. 2 designates the dowel stick to which are connected the straws in any desired or conventional manner. The dowel stick is provided with a laterally disposed opening 3 which is closed at one end, opens at its other end through the periphery of the dowel stick, and which is adapted to receive a manually actuated plunger or push-button 4 which is moved outwardly by means of a spring 5. The plunger 4 is preferably formed by a stamping to form a cup-shaped member to receive the spring 5 and it is formed into a cylindrical body portion having the slots 6. The plunger 4 is provided with a shoulder 7 and with an outwardly extending pressure piece 8 which is adapted to be manually actuated to effect the release of the plunger from the handle 9. The handle 9 is also preferably formed from a stamping to provide the outwardly extending collar 10 to receive the end of the dowel stick and the flathead 11 from which depend the spring fingers 12. These fingers at their free ends are outwardly deflected as at 13 and are provided with the inwardly extending depressions 14 which are adapted to interlock with openings 18 in the split collar 16 of a spring member 17. The split collar 16 is provided with an aperture 15 adapted to receive the manually actuated pressure piece 8 of the locking plunger 4.

It will be seen that in effect a push-button is employed to effect the interlocking of the handle with the dowel stick. The spring member 17 has extending upwardly from the sections of the split collar 16 the sides 19 which at their upper portion are deflected downwardly and inwardly as at 20 and then extend outwardly to form a centrally disposed spring loop 21 which extends through an opening 22 in the upper end of the handle in order to receive and resiliently retain in position the ring 23, which in turn retains the spring member 17.

The shoulders of the whisk are covered by a shield 24 having the upwardly extending cap 25 which receives the head formed by the upper terminal portion 26 of the whisk straws and it will be understood that this cap 25 is apertured to permit the dowel stick 2 to pass therethrough.

The parts when assembled appear as in Figure 1. The shield 24 is applied to the shoulders of the whisk, the spring member 17 having been assembled with respect to the handle 9, and it will be seen that when the ring 23 is inserted through the loop 21 the spring member 17 will resiliently secure it in assembled position with respect to the handle and is itself held in place by said ring 23.

The depressions 14 in the handle 9 are interlocked with the openings 18 in the split collar 16 so that the spring member 17, the ring 23, and the handle 9 are permanently locked together in assembled position. When the handle and spring member and ring as a unit are assembled with the dowel stick the push-button or spring pressed plunger 4 will have its pressure member 8 extending through an aperture 15 so that the handle will be locked in assembled position on the dowel stick. When, however, the straws of the whisk become worn out and are to be discarded it is not necessary to throw away the entire whisk handle, and all, but the shield 24 and the handle as a unit can be readily removed by pressing inwardly the push-button 4, and the handle after being removed can be assembled with respect to the dowel stick of a new whisk.

The spring fingers 12 of the handle 9 converge downwardly with spring tension and interlock with the split collar 16 of the spring member 17 which holds said finger in a circular position so that the effect of a closed handle is provided with the sides tapering downwardly. The split collar holds the spring fingers 12 in a circular position so that the handle is easily slipped into and removed from assembled position with respect to the dowel stick.

The shield 24 is preferably made of a stamping and it is cut out so that it resiliently engages the shoulders of the whisk and has a tendency to move upwardly on the dowel stick so that when the handle is positioned downwardly on the dowel stick and locked in position the shield will resiliently press against the inner ends of the spring fingers 12.

It will now be apparent that I have devised a new and useful whisk which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In a whisk, the combination with a dowel stick, of a spring pressed plunger carried by the dowel stick, a handle to engage the dowel stick having an inner resilient member and an outer member provided with spring fingers which interlock with the inner member, the rear portion of said inner member extending through said outer member, said spring pressed plunger in said dowel stick interlocking with said inner member and with one of said fingers, and a ring carried by said rear portion and bearing against said outer member to retain said handle members in assembled condition, and resiliently retained by said inner member in any position to which it is moved and thus prevent said ring from knocking about when the whisk is in use.

2. In a whisk, the combination with a dowel stick, of a handle comprising an outer member having downwardly and inwardly extending spring fingers provided at their lower ends with inwardly extending projections and one of them having an opening, and an inner member having a split collar at its lower end having openings to receive the projections of said fingers and having an opening to register with the opening in one of said spring fingers, said inner member extending through the upper end of said outer member to form an exterior loop, a ring engaging said loop and bearing against said outer member to retain said handle members in assembled condition and resiliently retained in position by said inner member, a dowel stick to receive said handle and a spring pressed plunger carried by said dowel stick to seat in the openings of said split collar and said finger to secure said handle in assembled position with respect to said dowel stick.

3. A dowel stick having an opening extending laterally through one side and closed at its opposite side, a spring within said opening, and a push-button having a slotted recessed body portion to contain one end of said spring.

4. In a whisk, the combination with a dowel stick, of a handle removably carried by the dowel stick and provided with a split sleeve having an opening, said dowel stick having an opening extending through one side and closed at its opposite side, a spring within said opening, and a push-button in said opening engaged by said spring to cause the push-button to interlock with the walls of the aperture in said split sleeve.

STEPHEN G. WILSON.